Figure 1:
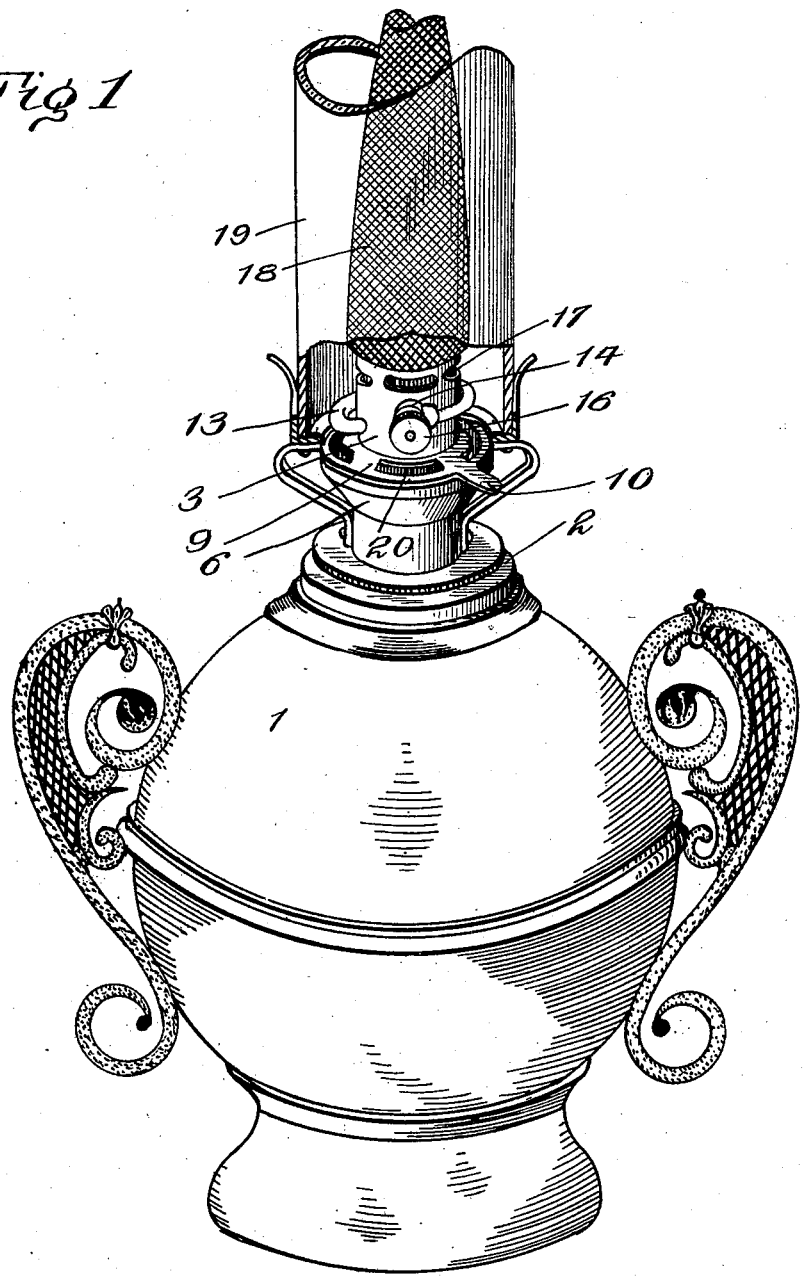

No. 860,996. PATENTED JULY 23, 1907.
G. G. SCHROEDER.
DENATURED ALCOHOL GAS LAMP.
APPLICATION FILED NOV. 19, 1906.

3 SHEETS—SHEET 1.

Witnesses
Inventor
George G. Schroeder
By Wm. F. Hodges
Attorney

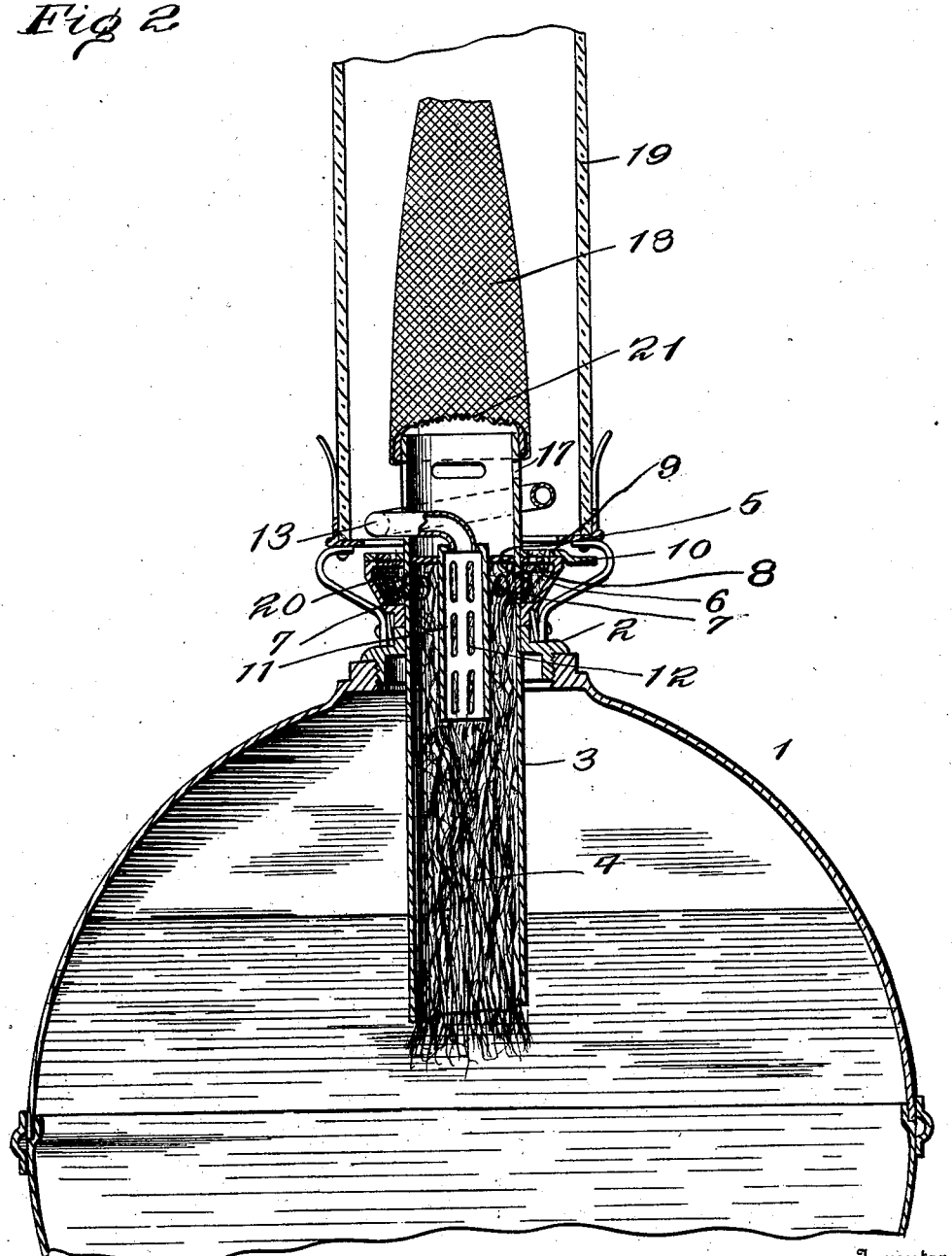

No. 860,996. PATENTED JULY 23, 1907.
G. G. SCHROEDER.
DENATURED ALCOHOL GAS LAMP.
APPLICATION FILED NOV. 19, 1906.
3 SHEETS—SHEET 3.
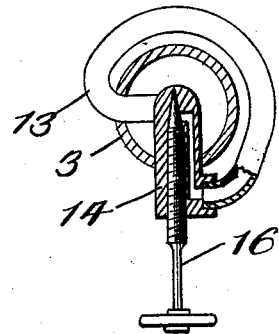
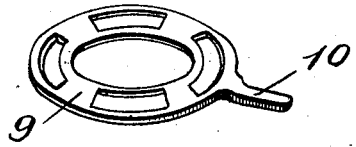
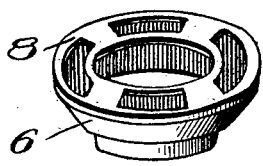
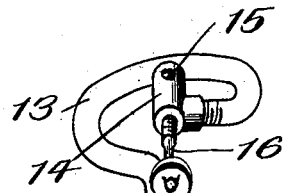
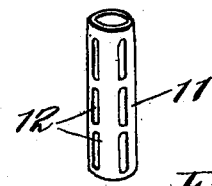
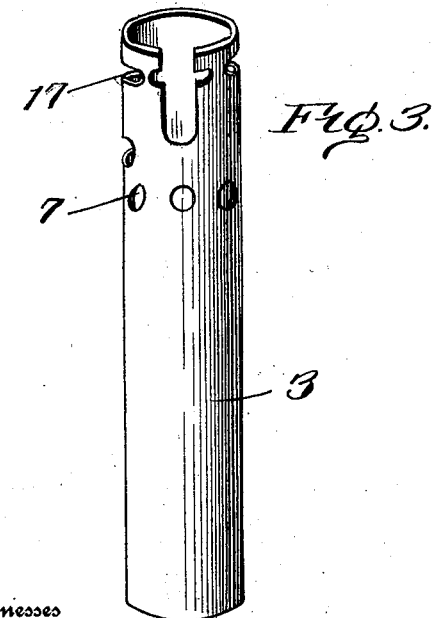
Inventor
George G. Schroeder
Witnesses
By
Attorney
THE NORRIS PETERS CO., WASHINGTON, D. C.

UNITED STATES PATENT OFFICE.

GEORGE G. SCHROEDER, OF WASHINGTON, DISTRICT OF COLUMBIA, ASSIGNOR TO INDUSTRIAL ALCOHOL HEAT AND LIGHT COMPANY, A CORPORATION OF SOUTH DAKOTA.

DENATURED-ALCOHOL GAS-LAMP.

No. 860,996.　　　　Specification of Letters Patent.　　　　Patented July 23, 1907.

Application filed November 19, 1906. Serial No. 344,047.

*To all whom it may concern:*

Be it known that I, GEORGE G. SCHROEDER, a citizen of the United States, residing at Washington, in the District of Columbia, have invented certain new and useful Improvements in Denatured-Alcohol Gas-Lamps, of which the following is a specification.

This invention has relation to denatured aclohol gas lamps, and it consists in the novel construction and arrangement of its parts as hereinafter shown and described.

The object of the invention is to provide a lamp of the character indicated which is adapted to convert liquid alcohol into a gas and mix the gas with air and burn the resultant mixture as an illuminant.

The parts are so arranged that the process above indicated is automatically accomplished.

The lamp consists primarily of a font adapted to hold the liquid alcohol. A burner is mounted upon the font and is provided with a depending tube which projects well into the font. The lower portion of said tube contains a wick or other capillary agent. A starting burner is arranged about the said tube at a point intermediate the ends thereof, and the said tube is provided with perforations which communicate with said starting burner. The said starting burner contains a fibrous material, and is covered by a perforated plate with a rotatable perforated damper located above the same, and which is adapted to be moved so as to close the perforations of the said plate. The upper end of the said tube is provided with air admission ports. A perforated cylinder is located in the said tube, and is embedded in the upper end of the capillary agent. A volute tube is attached at its lower end to the said cylinder, and passes through the side of the first said tube, above the starting burner, then passes around the first said tube and connects at its upper end with a valve casing which extends radially into the first said tube below the air admission ports thereof. Said valve casing is provided with a needle valve and a gas exit. The said gas exit being located concentrically with relation to the first said tube. An incandescent gas mantle is arranged above the upper end of the first said tube, and serves as the illuminant retaining medium.

In the accompanying drawings:—Figure 1, is a perspective view of the lamp. Fig. 2, is a vertical sectional view of the upper portion of the lamp. Fig. 3, is a perspective view of the tube. Fig. 4, is a perspective view of the starting burner. Fig. 5, is a perspective view of the damper for the starting burner. Fig. 6, is a perspective view of the tube cap. Fig. 7, is a transverse sectional view of the tube showing the volute tube in position thereon. Fig. 8, is a perspective view of the volute tube. Fig. 9, is a perspective view of the cylinder; and:—Fig. 10, is a perspective view of the plate that confines the capillary agent in the tube.

The lamp comprises the font 1, into the top of which is screwed the perforated gasket 2. The tube 3, passes through the perforation of the gasket 2, and extends well into the body of the font 1. The wick or other capillary agent 4, is located in the tube 3, and is prevented from entering the upper end thereof by the plate 5. The pan 6, surrounds the intermediate portion of the tube 3, and rests upon the upper edge of the gasket 2. Said pan constitutes a starting burner. The tube 3, is provided with the perforations 7, 7, which communicate with the interior of the pan 6. The top of the pan 6 is covered by a perforated plate 8, and the perforated damper 9, is located over the said plate and is arranged to rotate about the tube 3. Said damper is provided with the radially extending handle 10, by means of which the said damper may be turned in order to bring its perforations in alinement with the perforations of the plate 8, or its closed portions over the same.

The cylinder 11, passes through the plate 5, and is concentrically arranged with relation to the tube 3, said cylinder is open at its lower end and is provided in its side with a number of elongated perforations 12, 12, which are vertically disposed. The said cylinder is embedded in the capillary agent 4. The volute tube 13, attaches at its lower end to the upper end of the cylinder 11, then passes laterally through the side of the tube 3, and spirally around the same over the starting burner above described.

The upper end of the tube 13, connects with the valve casing 14, which extends radially into the tube 3, and is provided with the gas exit 15, which is concentrically positioned with relation to the tube 3. The needle valve 16, is located in the casing 14, and is adapted to open or close the gas exit 15 thereof. The upper portion of the tube 3, constitutes a mixing chamber, and is provided with a number of air admission ports 17. The mantle 18 is located over the upper end of the tube 3, and is incased within the chimney 19. If desired the upper end of the tube 3, may be covered by a screen 21.

The operation of the burner is as follows:—The font 1, is filled with denatured alcohol. This liquid is taken up by capillary attraction by the wick 4, and is carried into the fibrous material (such as asbestos) 20, with which the pan 6, is filled. The damper 9, is then turned so that the perforations of the plate 8 are open. A match is then applied over the said perforations and the fumes of alcohol within the fibrous material 20, are ignited. The resultant flame envelops the upper portion of the tube 3, and also the volute tube 13. These parts become thoroughly heated, and the fumes of alcohol within the volute tube 13 are gasified. When the parts are sufficiently heated, the needle valve 16 is opened and the gas escapes through the exit 15, mixes with air which enters the upper portion of the tube 3, through the ports 17, and the resultant mixture is ignited and illuminates the mantle 18. The damper 9, is then closed over the openings of the plate 8, and the flame from the starting burner is doused. The liquid from the font 1, then passes up through the wick 4, and enters the cylinder 11, in the form of a vapor. This vapor passes up through the volute tube 13, and is gasified by coming in contact with the heated sides thereof, and the gas thus formed passes out through the exit 15, of the valve casing 14, and is mixed with air and ignited as above described. In order to extinguish the light it is necessary to close the needle valve 16, only. Thus it will be seen that a simple and effective means for converting denatured alcohol into an illuminant is provided, and that the parts may be readily operated in starting and extinguishing, and are unattended by dangerous elements.

Having described my invention, what I claim as new and desire to secure by Letters Patent is:—

1. A lamp comprising a font, a tube entering said font and provided with openings, a partition dividing said tube to form a combustion chamber at the upper end thereof, a capillary agent located in said tube below said partition a volute vaporizing chamber surrounding said combustion chamber and having an inlet embedded in said capillary agent and an outlet entering said combustion chamber, and a valve controlling said outlet, and a starting pan surrounding said tube and communicating with said openings.

2. A lamp comprising a font, a tube entering said font and provided with openings, a partition dividing said tube to form a combustion chamber at the upper end thereof, a capillary agent located in said tube below said partition, a volute vaporizing chamber surrounding said combustion chamber and having an inlet embedded in said capillary agent, a valve casing attached to said vaporizing chamber and provided with a gas outlet, a valve controlling said outlet, and a starting burner surrounding said tube and communicating with said openings.

3. A lamp comprising a font, a tube entering said font and provided with openings, a partition dividing said tube to form a combustion chamber at the upper end thereof, a capillary agent located in said tube below said partition, a volute vaporizing chamber surrounding said combustion chamber and having an inlet embedded in said capillary agent, a valve casing attached to said vaporizing chamber and located within said combustion chamber, said casing having a gas opening concentric with said combustion chamber, a valve controlling said outlet, and a starting burner surrounding said tube and communicating with said openings.

4. A lamp comprising a font, a tube entering said font and provided with openings, a partition dividing said tube to form a combustion chamber at the upper end thereof, a capillary agent located in said tube below said partition, a volute vaporizing chamber surrounding said combustion chamber and having an inlet embedded in said capillary agent, a valve casing attached to said vaporizing chamber and extended radially into said combustion chamber, the extended portion being provided with a gas outlet, a valve controlling said outlet, and a starting burner surrounding said tube and communicating with said openings.

5. A lamp comprising a font, a tube entering said font and provided with openings, a partition dividing said tube to form a combustion chamber at the upper end thereof, a capillary agent located in said tube below said partition, a perforated cylinder located in said capillary agent, a volute tube attached to said cylinder and passing to the exterior of and around said combustion chamber, a valve casing attached to said volute tube and entering said combustion chamber, a valve located in said casing, said casing being provided with a gas outlet controlled by said valve, and a starting burner surrounding said tube and communicating with the openings therein.

6. A lamp comprising a font, a tube entering said font, and provided with perforations, a capillary agent located in said tube below said perforations, a volute vaporizing chamber surrounding said combustion chamber and having an inlet embedded in the capillary agent, a valve controlling the outlet from said vaporizing chamber, and a starting burner surrounding said tube communicating with said perforations.

7. A lamp comprising a font, a tube entering the font and provided with perforations, a capillary agent located in the tube, a volute tube entering the first tube and passing around the same and having a discharge within the first tube, a starting burner surrounding the first tube and communicating with said perforations, said starting burner being located below said volute tube, a perforated plate located over the starting burner, and a perforated damper arranged to rotate over said plate.

8. A lamp comprising a font, a tube entering the font, a capillary agent located in the tube, a volute tube entering the first tube and passing around the same, and having a discharge within the first tube, a starting burner surrounding the first tube, the first tube having perforations which communicate with said starting burner, said starting burner being located below the volute tube.

9. A lamp comprising a font, a tube entering the font, a capillary agent located in the tube, a volute tube entering the first said tube and passing around the same, and having a discharge within the first tube, a starting burner surrounding the first tube, fibrous material located in said starting burner, the first tube having perforations which communicate with said starting burner, said starting burner being located below the volute tube.

10. A lamp comprising a font, a tube entering the font, a capillary agent located in the tube, a volute tube entering the first tube and passing around the same, and having a discharge within the first tube, a starting burner surrounding the first tube, fibrous material located in said starting burner, the first tube having perforations which communicate with said starting burner, said starting burner being located below the volute tube, a perforated plate located over the starting burner, and a perforated damper arranged for rotation over said plate.

In testimony whereof I affix my signature, in presence of two witnesses.

GEORGE G. SCHROEDER.

Witnesses:
WM. S. HODGES,
JAMES B. NICHOLSON.